United States Patent [19]

Hotomi

[11] Patent Number: 4,717,926

[45] Date of Patent: Jan. 5, 1988

[54] ELECTRIC FIELD CURTAIN FORCE PRINTER

[75] Inventor: Hideo Hotomi, Suita, Japan

[73] Assignee: Minolta Camera Kabushiki Kaisha, Osaka, Japan

[21] Appl. No.: 927,104

[22] Filed: Nov. 5, 1986

[30] Foreign Application Priority Data

Nov. 9, 1985 [JP] Japan ............................... 60-251687
Nov. 9, 1985 [JP] Japan ............................... 60-251688

[51] Int. Cl.[4] ............................................ G01D 15/16
[52] U.S. Cl. ......................... 346/140 R; 101/DIG. 13
[58] Field of Search ......................... 346/140, 1.1, 159; 101/DIG. 13

[56] References Cited

U.S. PATENT DOCUMENTS 3,739,396 6/1973 Harada ............................... 346/140
4,364,054 12/1982 Kelly .............................. 346/140 X
4,454,519 6/1984 Oosaka ............................... 346/140
4,575,737 3/1986 Vermot-Gaud ..................... 346/140

*Primary Examiner*—Joseph W. Hartary
*Attorney, Agent, or Firm*—Burns, Doane, Swecker & Mathis

[57] ABSTRACT

The printer provides means for generating so called electric field crutain force which act on toning material being existed at a tip end of a nozzle means to eject the toning material therefrom toward a recording material. Said means includes at least one pair of electrodes arranged near to the tip end of the nozzle and an alternating electric voltage source for applying an AC voltage to said electrodes in order to generate said electric field curtain force.

30 Claims, 14 Drawing Figures

ELECTRIC FIELD CURTAIN FORCE PRINTER

BACKGROUND OF THE INVENTION

1. Field of the Invention

The present invention relates to a printer which makes use of electric field curtain force.

2. Description of the Prior Art

Various types of printer such as an impact printer (the wire-dot type and the shuttle type), an electrostatic printer, a thermal printer, an inkjet printer, and a laser printer have been developed as an output apparatus of character image data or the like. As to an output apparatus, such properties are demanded as compactness, coloring, the freedom from maintenance, low cost, low noise, high rate of printing and high resolution. An inkjet printer is an output apparatus which can satisfy best such demands as compactness, coloring, low cost and high rate of printing.

An inkjet printer includes the pulse pressure type, the bubble jet type and the slit jet type. In a printer of the pulse pressure type, printing ink is jetted from a nozzle according to a change in pressure applied by a piezoelectric device, and they reaches without bias to a paper to be recorded. On the other hand, in a printer of the bubble jet type, bubbles are generated with heat generated with a resistance device embedded in a nozzle, and printing ink is jetted by using the force due to the expansion of a bubble. In a printer of the slit jet type, printing ink is filled within a slit-like orifice wherein recording electrodes are aligned in correspondence to pixels, and a DC voltage pulse is applied between a pair of a recording electrode and a counter electrode arranged behind a recording paper. Thus, the printing ink around the top of the record electrode is charged electrically so that the ink is ejected towards the recording paper with an electrostatic force to record a dot on the paper. Though the generation of jet in a printer of the slit jet type makes use of electric force as well as a printer according to the present invention, the principle of the generation of jet is different from each other.

SUMMARY OF THE INVENTION

An object of the present invention is to provide an inkjet printer with a new type of the generation of inkjet which can satisfy some of demands as mentioned above.

A printer which makes use of electric field curtain force according to the present invention comprises: a nozzle means which is insulated electrically, which nozzle means having an aperture of narrow size; a means for supplying toning material into the nozzle means; a means for applying the electric field curtain force on toning material near the aperture of the nozzle means which includes at least one pair of electrodes for generating the electric field curtain force, said electrodes being arranged near the aperture so as to oppose to each other with respect to the direction of ejection of the toning material; an electric power source which can apply alternating voltage to the electrodes; and a control means for controlling the application of the alternating voltage by the electric power source selectively according to image signal.

An advantage of the present invention is to provide an inkjet printer with a new type of jet generation which makes use of electric field curtain force.

BRIEF DESCRIPTION OF THE DRAWINGS

The invention is illustrated diagramatically in the following drawings, wherein.

DESCRIPTION OF PREFERRED EMBODIMENTS

Figure 1A:
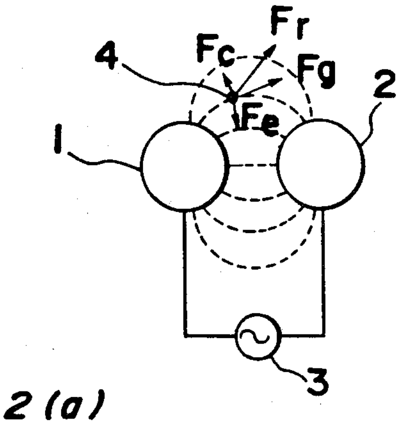
FIGS. 1 (*a*) and (*b*) are diagrams which show the principle of the generation of electric field curtain force, respectively.
Figure 1B:
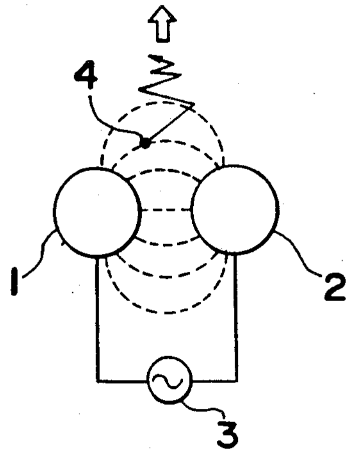

To assist the understanding of the present invention, the principle of the generation of electric field curtain force will be briefly described by using FIGS. 1(*a*) and (*b*). Two bar electrodes 1, 2 are aligned in parallel, and an AC electric power source 3 is connected between them. The electric power source 3 generates the AC electric field, and FIG. 1(*a*) shows electric force lines generated at an instant with dashed lines. Then, the following three forces act on a charged particle which locates near the bar electrodes 1, 2 regardless of the polarity of the electric field: the gradient force $F_g$ which is parallel to the gradient of the electric field, the centrifugal force $F_c$ which is perpendicular to the gradient force $F_g$ and points in a direction away from a plane which includes both axes of electrodes 1, 2, and an external force $F_e$ due to the gravity and/or the wind blow. When the external force $F_e$ is negligibly small, a force $F_r=F_g+F_c$ acts on a charged particle 4 in a direction away from a plane which includes both axes of electrodes 1, 2. (A charged particle which locates below the plane through the electrodes 1, 2 in FIG. 1(*a*) moves away downwards.)

Because the direction of the electric force line is inverted alternatively with the applied AC voltage, a charged particle in the field is moved zigzag as shown in FIG. 1(*b*), and is flown away in the air under an electric field curtain force as a result in a direction as indicated by a bold arrow in FIG. 1 (*b*).

In the following, printers according to preferred embodiments of the present invention will be described.

Figure 2A:
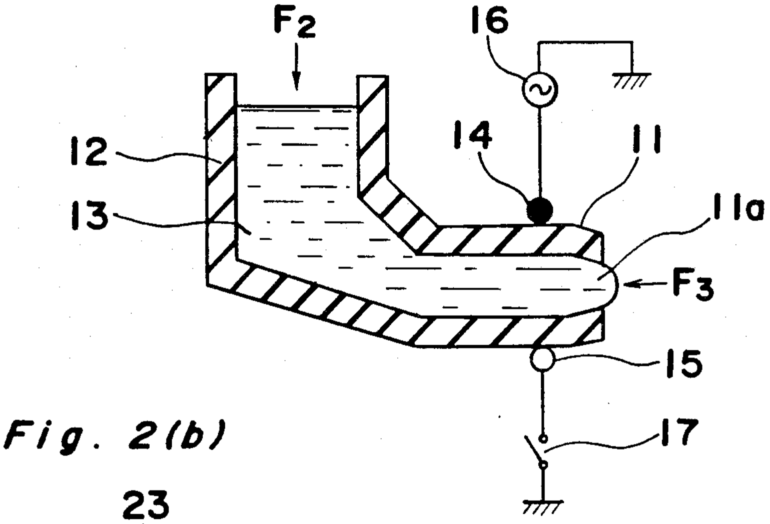
FIGS. 2 (*a*) and (*b*) are schematic sectional views of a print head with a pair of electrodes, respectively.
Figure 2B:
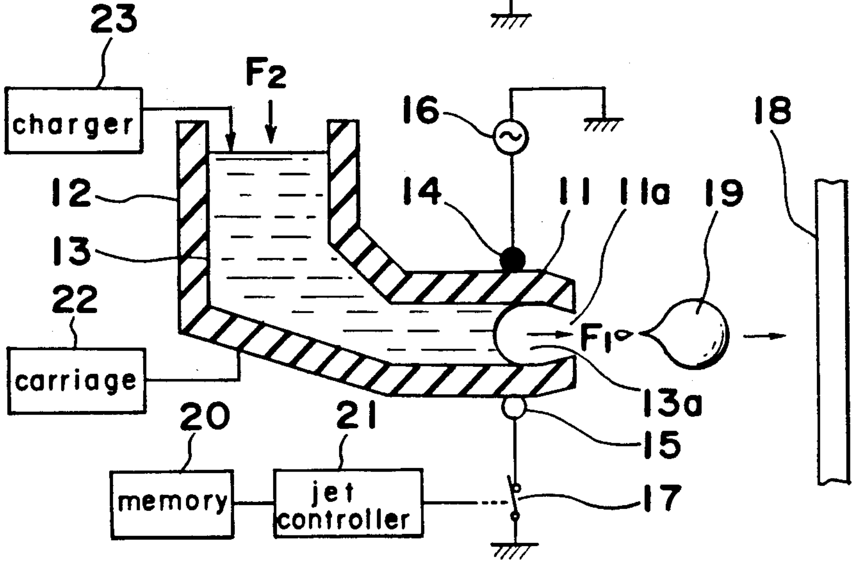

FIGS. 2 (*a*) and (*b*) show a recording head of an inkjet printer according to the present invention schematically.

An electrically insulating ink bottle 12 has a nozzle 11 with an orifice 11*a*. An appropriate amount of ink 13 is provided into the ink bottle 12 from an upper opening and is filled down to the orifice 11*a* due to the gravity. The ink 13 may be charged ink having a high electrical resistivity in which color particles charged beforehand are dispersed uniformly. Two electrodes 14, 15 arranged on the nozzle 11 near the orifice 11*a* opposing to each other with respect to the central line of the nozzle 11 so as not to contact with the ink 13. One electrode 14 is connected to an electric power source 16 of low frequency, while the other 15 is connected to the ground via a switch 17.

If the switch 17 is open, the AC electric field acting on the ink 13 is not generated. Then, a force $F_2$ due to the gravity which pushes the ink towards the orifice 11*a* and a surface tension $F_3$ which pushes back the ink counter to the force $F_2$ acts on the ink 13 located between the orifice 11*a* and the electrodes 14, 15. If both $F_2$ and $F_3$ are balanced with each other, the ink 13 is not pushed out of the orifice 11*a*, as shown in FIG. 2(*a*).

When the switch 17 is closed by a jet controller 21 according to an image signal received from memory means 20, as shown in FIG. 2(*b*), the electric field is generated so as to act on charged color particles contained in the ink 13 or the charged ink 13 itself, and a portion of the ink existing near the orifice 11*a* is separated from other portion of the ink so as to form a droplet 19, and the droplet 19 is ejected from the orifice 11*a* under the influence of the electric field curtain force $F_1$ toward a recording paper 18 to form a dot thereon. (The printer according to this preferred embodiment is of the on-demand type wherein an inkjet is ejected only on printing.) As for the other portion of the ink which locates opposite to the orifice 11*a* with respect to the electrode pair 14, 15, the electric field curtain force acts on the other portion so as to push it back against the force $F_2$. After the ejection of the droplet, the nozzle head is moved by a carriage 22 having a driving mechanism therefor.

For example, the nozzle 11 has following dimensions: the inner diameter of the orifice 11*a* is about 100 μm and the outer diameter of the nozzle 12 is about 400 μm; The distance between the top of the nozzle 11 and the center of the electrodes 14, 15 is about 100 μm. The distance between the top end of the nozzle 12 and the recording paper 18 is about 4 mm. The ink 13 consists of a solvent of high-resistivity solution (its electrical conductivity of about $1\times10^{-12}(\Omega\cdot cm)^{-1}$) and pigment particles having diameters of 0.5–10 μm dispersed in the solvent. The viscosity of the ink is about 6 cP and the surface tension is about 27 dyn/cm. When the switch 17 is closed and the AC electric field of 800 Hz under a voltage of about 70 V is applied between the electrodes 14 and 15, an ink droplet 19 is ejected toward the paper to form a dot thereon. Thus, a dot of diameter of about 50 μm can be formed by narrowing the aperture size of the nozzle 12 and by controlling the viscosity of the ink 13.

If an ink in which dye material is dissolved in a solvent is used as the ink 13, it should be charged before the filling it into the ink bottle 12.

A nozzle 11 shown in FIGS. 2(*a*), (*b*) has an upper limit of the response to the switching frequency because it takes a relatively long time to fill a cavity 13*a* caused by the ejection of the droplet 19 with the remainder of the ink 13 due to the gravity and the capillary action.

Figure 3A:
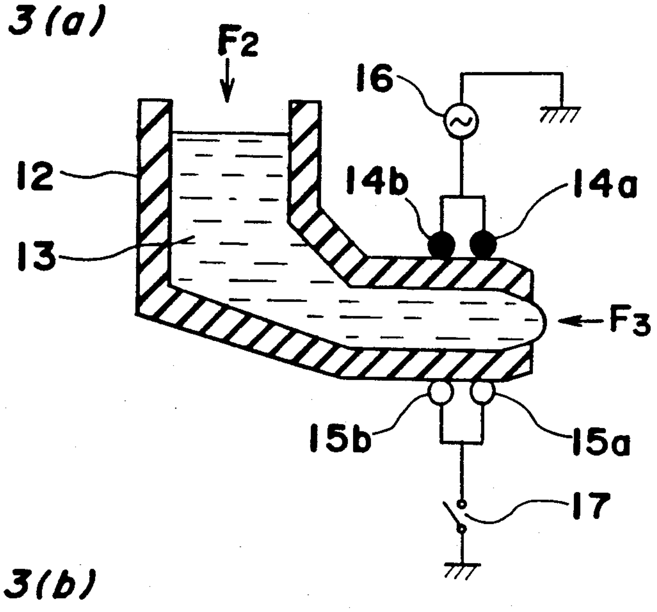
FIGS. 3 (*a*), (*b*) and (*c*) are schematic sectional views of a print head with two pairs of electrodes, respectively.
Figure 3B:
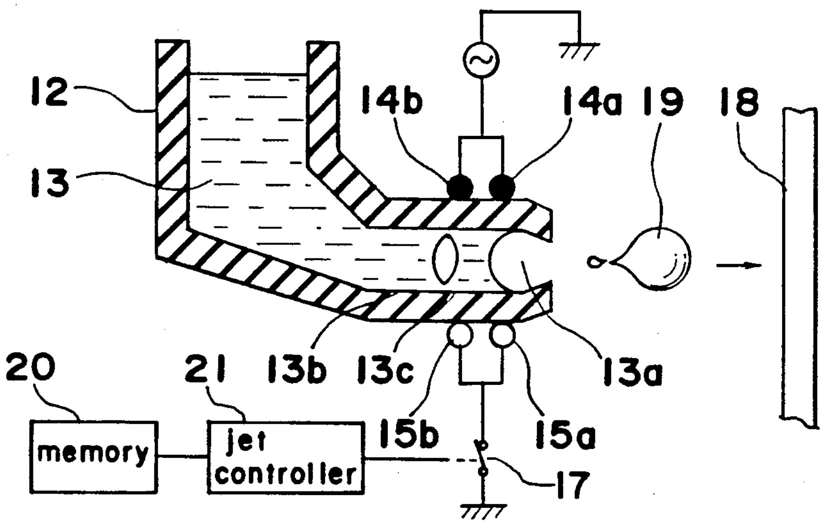
Figure 3C:
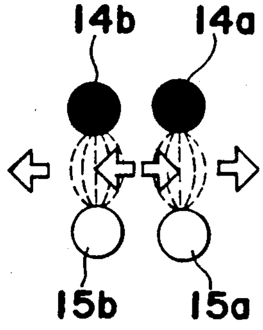

In another preferred embodiment according to the present invention, a pair of electrodes 14*a*, 14*b* and a pair of electrodes 15*a*, 15*b* are provided, respectively, as shown in FIG. 3(*a*). That is, the four electrodes are set on the nozzle 11 near the orifice 11*a* so as not to make contact with the ink 13; the electrodes 14*a* and 14*b* are arranged separated by an appropriate distance with each other, and are arranged so as to oppose the electrodes 15*a* and 15*b* with respect to the central line of the nozzle 11, respectively.

When the AC electric voltage is applied between the pair of the electrodes 14*a*, 14*b* and the pair of the electrodes 15*a*, 15*b*, the electric field curtain force acts on the ink near the electrodes 14*a*, 14*b*, 15*a*, 15*b* as shown by arrows in FIG. 3(*c*). The electric field curtain force does not act on a portion of the ink in the area between a first and second electrode pairs 14*a*, 15*a* and 14*b*, 15*b* substantially because the electric field curtain forces generated by said first and second pairs act in an opposite direction so as to cancel with each other. On the contrary, the electric field curtain force generated by the first pair acts on a portion of the ink in the right side with respect to the first electrode pair 14*a*, 15*a* in FIG. 3(*c*), while that generated by the second pair acts toward the left side in FIG. 3(*c*).

As shown in FIG. 3(*a*), the pushing force $F_2$ is controlled so as to balance the surface tension $F_3$ when the switch 17 is open. Thus, the ink 13 is not pushed out through the orifice 11*a*, as in case of FIG. 2(*a*).

If the switch 17 is closed as shown in FIG. 3(*b*), the ink between the first electrode pair 14*a*, 15*a* and the orifice 11*a* is ejected from the orifice 11*a* toward the paper 18 due to the electric field curtain force, and the ejected droplet 19 forms a dot on the paper 18, as in case of FIG. 2(*b*). On the other hand, the electric field curtain force acts on the ink in the area innerward of the second electrode pair 14*b*, 15*b* so that a cavity 13*b* is generated therein. Further, the electric field curtain force does not act substantially on the ink 13*c* between the first and second pairs 14*a*, 15*a* and 14*b*, 15*b* as mentioned above. Thus, the ink 13*c* remain in the same position, and it becomes a spare ink for the next droplet to be generated with a following pulse signal to close the switch 17. That is, a cavity 13*b* formed by the ejection of the droplet 19 is filled immediately by the spare ink 13*c* due to the gravity and the capillary action. Therefore, the frequency response of the ink nozzle 11 can be improved, and the size of a dot can be reduced.

If more than two pairs of electrodes are set, they should be arranged so that the electric field curtain force acts on the ink towards the orifice and that a stagnant ink for the next pulse is remained near the electrodes 14*a*, 14*b*, 15*a*, 15*b*.

Figure 4A:
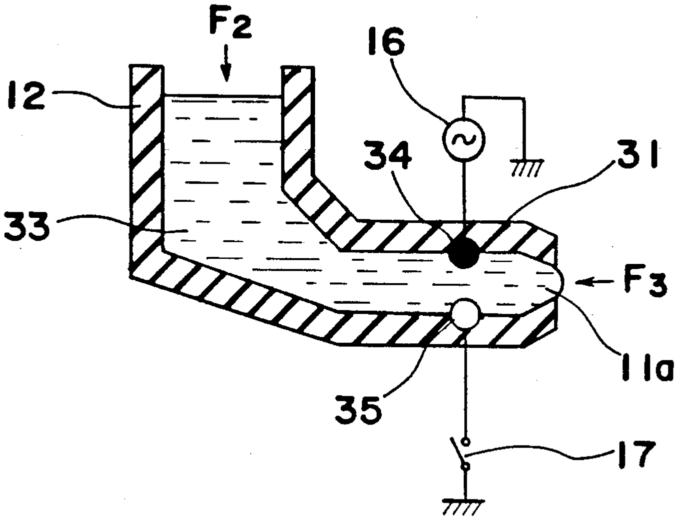
FIGS. 4 (*a*) and (*b*) are schematic sectional views of a print head with a pair of electrodes, respectively.
Figure 4B:
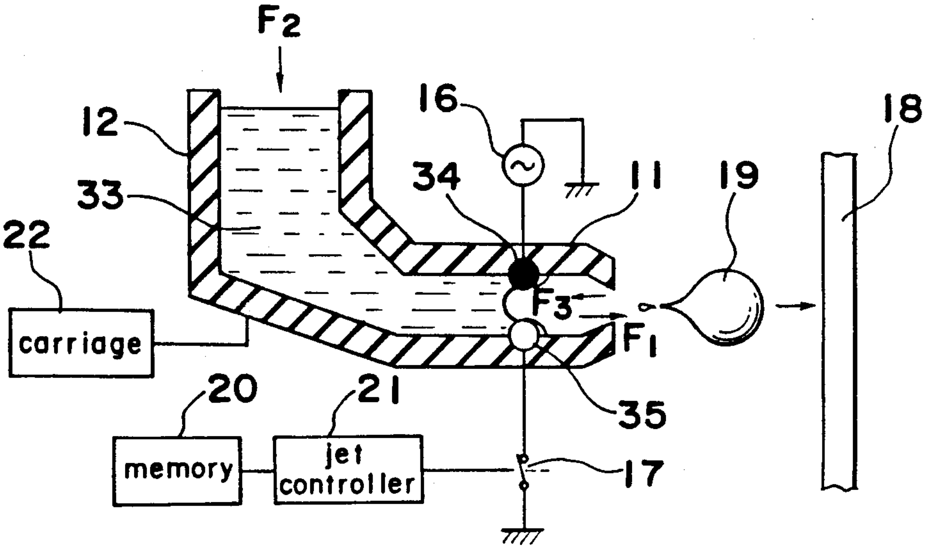

In the embodiments mentioned above, the ink 13 are charged beforehand. However, the present invention can also be applied to an ink not charged beforehand. Such an example is shown in FIGS. 4(*a*) and (*b*), wherein electrode pair 34, 35 are arranged on the inner side wall of the nozzle 11 near the orifice 11*a* so as to oppose to each other with respect to the central line of the nozzle 11 so that the electrodes 34 and 35 are made contact with the ink 33. One electrode 34 is connected to an electric power source 16 of low frequency, while the other 35 is connected to the ground via a switch 17.

Figure 5A:
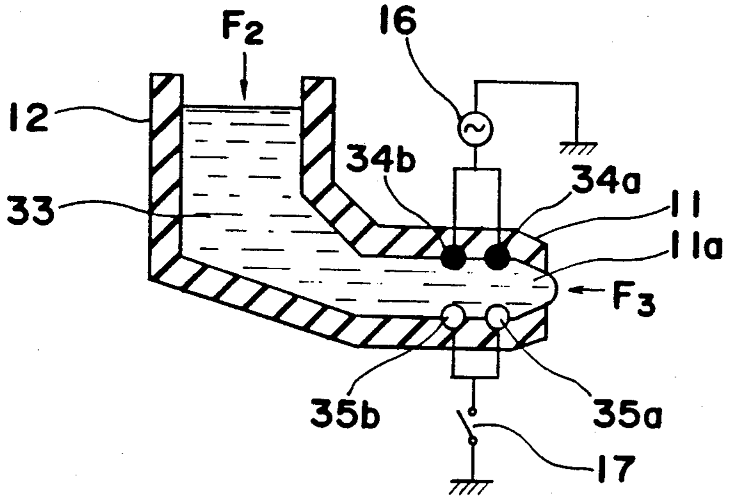
FIGS. 5 (*a*) and (*b*) are schematic sectional views of a print head with two pairs of electrodes, respectively.
Figure 5B:
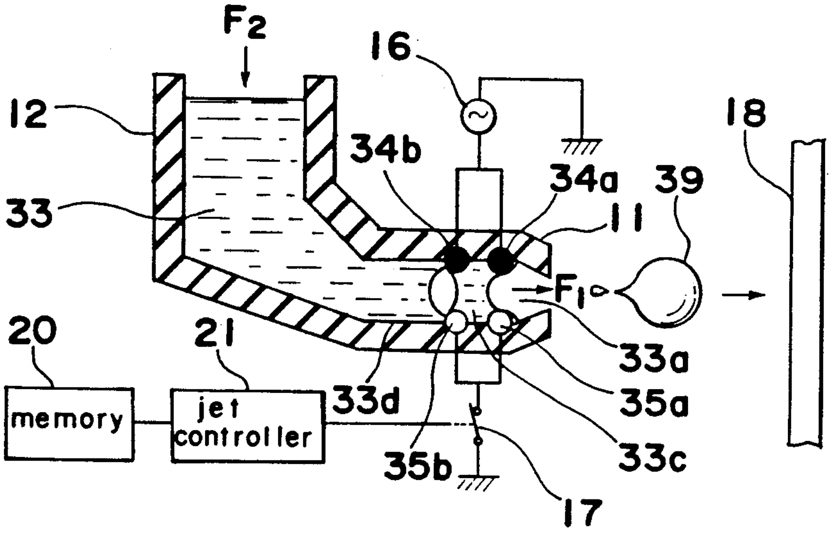

If the switch 17 is closed and the AC electric voltage is applied by the electric power source 16, the ink 33 or color particles contained in the ink 33 have charges due to the contact to the electrodes 34, 35. Thus, the electric field acts on the ink 33. Even if the amount of the charges of the ink 33 or the color particles transferred by the contact is small at first, the ink 33 or the color particles is oscillated many times due to the AC electric field and repeats the frictional charging. Finally, the ink 33 or the color particles is charged sufficiently to form a droplet under the electric field curtain force. FIGS. 5(*a*), (*b*) show an embodiment wherein two pairs of inside electrodes 34*a*, 34*b* and 35*a*, 35*b* are arranged inside of the nozzle in replace of inside electrodes 34 and 35 of FIG. 4(*a*), respectively, in order to improve the frequency characteristics by using the principle adopted in FIGS. 3(*a*), (*b*). The four electrodes are set on the inner wall of the nozzle 11 near the orifice 11a so as to make contact with the ink 33; the electrodes 34a and 34b are arranged separately by an appropriate distance, and are arranged so as to oppose to the electrodes 35a and 35b with respect to the central line of the nozzle 11, respectively. When the electric field is applied between the electrodes 34a, 34b and 35a, 35b, the electric field curtain force makes a droplet 39 which is ejected toward the paper 18, leaving a vacant space 33a near the orifice 11a and forming a vacant space 33b rearside of the second electrodes 34b, 35b, while a stagnant ink 33c is remained inbetween the first and second electrode pairs (34a, 35a), and (34b, 35b). Thus, the frequency characteristic can be improved.

Figure 6:
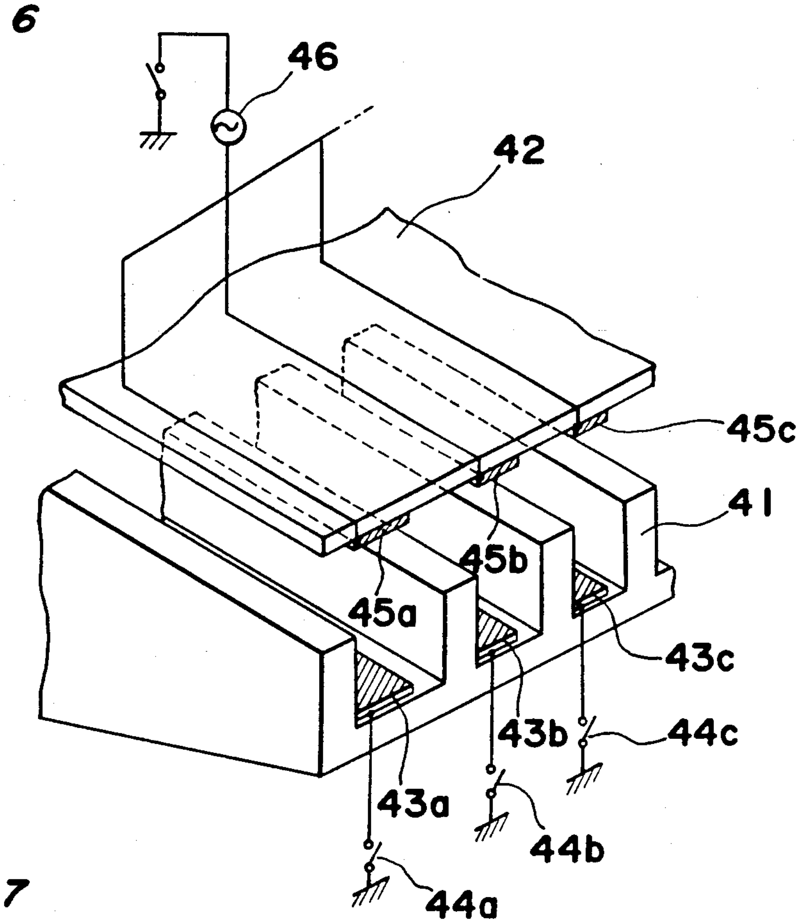
FIG. 6 is a perspective view of a multihead.

FIG. 6 shows a multiline head schematically, wherein a plurality of very small nozzles is aligned in parallel in correspondence to each pixel. An ink nozzle is constructed by combining an insulating nozzle head 41 having parallel grooves and an insulating cover plate 42 so as to form a plurality of nozzles, each having a rectangular crossection. Gold electrodes 43a, 43b, . . . of about 50 μm width and about 10 μm of thickness are formed on the bottom plane of the rectangular grooves, and they are connected to the ground via switches 44a, 44b, . . . , respectively. Gold electrodes 45a, 45b, . . . of similar size are formed on the lower surface of the plate 42, each corresponding to one of the electrodes 43a, 43b, . . . , and they are connected to an AC electric power source 46. By closing switches 44a, 44b, . . . selectively by an jet controller (not shown) according to image signals stored in a memory (not shown), ink droplets fly out only from grooves which are connected to the closed switches.

As a printing material for the printer according to the present invention, toner can also be used, which is widely used for the electrophotographic system.

Figure 7:
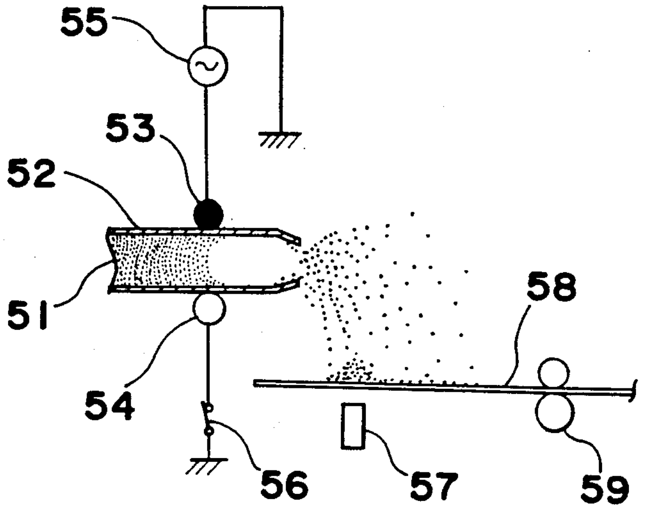
FIG. 7 is a diagram which shows the ejection of toner.

That is, toner particles filled in a nozzle head can be ejected out by the action of the electric field curtain force. FIG. 7 shows an experimental apparatus schematically, wherein toner power 51 of small diameter from 10 to 20 μm are filled in an insulating nozzle 52 with an orifice of inner diameter of 2 mm. The toner powder having been charged by 8–16 μC/g with use of a surface activation processing beforehand. Electrodes 53 and 54 are set on the outer wall of the nozzle 52. One electrode 53 is connected to an AC electric power source 55, while the other 54 is connected to the ground via a switch 56.

When an AC electric voltage of about 2 kV was applied between the electrodes 53, 54 after having been shaped to alternating pulses, toner particles 51 were scattered like a fume. The reason for shaping the AC voltage to alternating pulses is that a stronger electric field curtain force can be obtained by an abrupt change in the voltage. By using an attraction electrode 57 placed below a paper 58, a toner image is formed on the paper 58 and it is fixed by fixing rollers 59.

Figure 8:
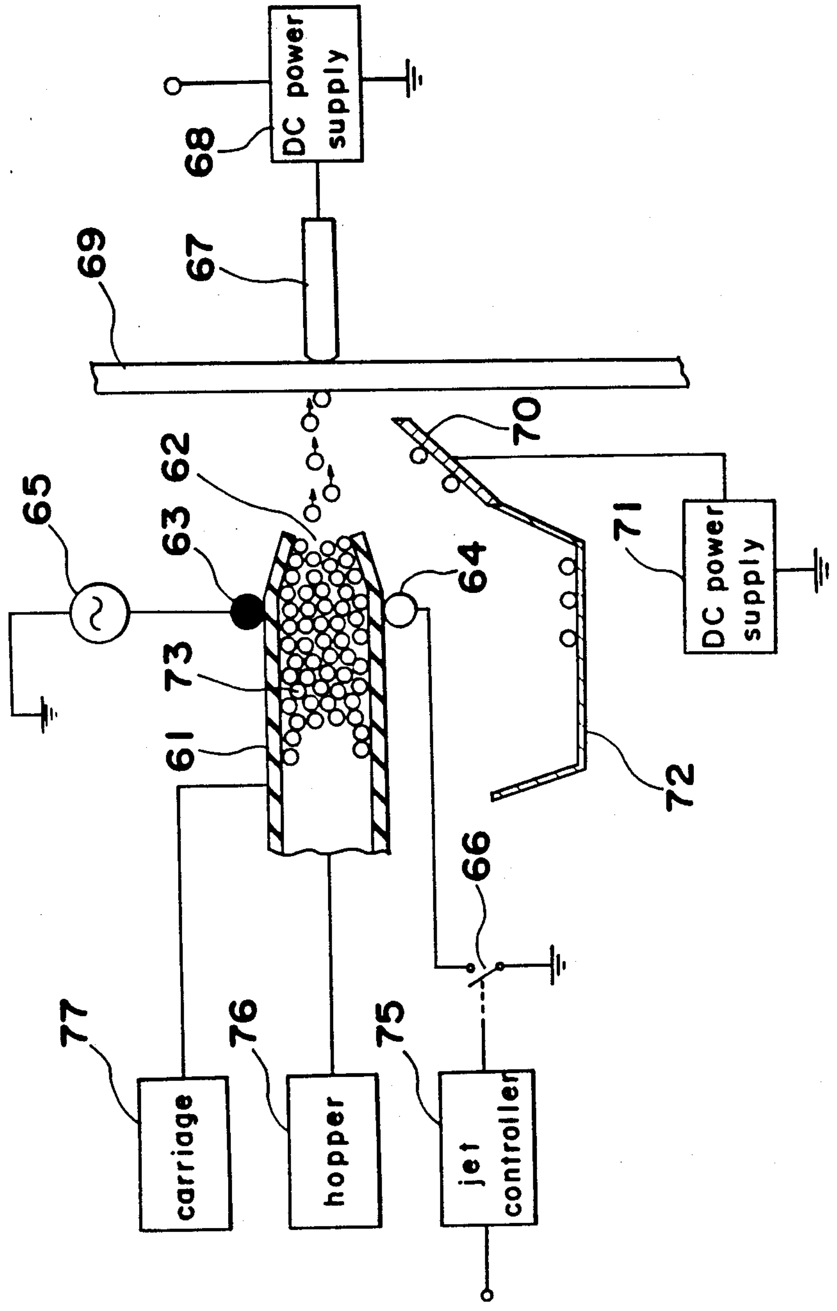
FIG. 8 is a schematic diagram of a printer using toner.

FIG. 8 shows a printer with a nozzle head for which the idea explained above by using FIG. 7 is utilized. An insulating nozzle 61 has an orifice 62 of an inner diameter of about 100 μm. A pair of electrodes 63, 64 are set on the outside of the nozzle 61 so as to oppose to each other with respect to the central line of the nozzle 61. The electrode 63 is connected to an AC electric power source 65, while the other 64 is grounded via a switch 66. A needle electrode array 67 which is connected to a DC electric power source 68 is arranged behind a paper 69 opposed to the orifice 62 of the nozzle 61. The needle electrode array 67 is a composite of a plurality of very small needle electrodes which are aligned perpendicularly to a direction of the paper feed. The electric power source 68 can supply a DC voltage on a needle electrode so that toners ejected from the orifice 62 are attracted to a correct position on the paper or to the needle electrode, as shown by arrows in FIG. 8. An electrode plate 70 which is connected to a DC electric power source 71 is placed slantwise below a region between the orifice 62 and the paper 69 in order to prevent the scattering of toners. A collection tray 72 is placed continuously in order to collect toners trapped by the electrode plate 70. The DC bias voltage applied by the electric power source 71 is set so high as to attract stray toner particles not moving towards the paper 69.

Toner 73 is filled in the nozzle 61 from a hopper 76 being driven by a motor provided for supplying toner.

The nozzle 61 can be shifted along the recording paper 69 by a carriage 77 perpendicular to the direction of the paper feed. When the nozzle 61 is moved to a position in correspondence to a printing position, a DC voltage is applied between the electrodes 63, 64 by closing the switch 66 with a jet controller 75 according to an image signal sent for example from an image reader not shown. At the same time, a DC voltage is applied to a needle electrode in the needle electrode array 67 in correspondence to the printing position. Then, toner particles having been beforehand charged are ejected from the orifice 62 so as to adhere on an appropriate position on the paper 69.

Though it is most economical to apply a DC voltage only on one electrode in correspondence to the printing position, the voltage may also be applied uniformly to all needle electrodes of the array 67.

As a mechanism such as carriages 22, 77 for moving one or a few nozzles relative to the paper, there may be used a head driving mechanism employed in a conventional inkjet printer or that of a thermal printer. (See for example, a U.S. patent application Ser. No. 786,821 filed on Sept. 27, 1985 by the same assignee of the application.)

A printer according to the present invention have following advantages.

The principle and the structure of print head is simple.

The size of the nozzle head can be made smaller when compared with an inkjet printer of the pulsed pressure type because a large change in volume can be induced with a small action area.

The head has a long life because it is not under physical stress on the application of AC voltage.

When compared with an inkjet printer of the bubble jet type, the ink does not deteriorate due to heat, and the heat is not stored in the head.

The AC voltage of low frequency can be applied only by a switch connected to the ground. Thus, the driving of print head is easy.

The frequency response of the ejection of toning material can be enhanced with increase in frequency of the AC voltage in order to make the recording speed high (though the speed is limited by the viscosity of ink and the size of ink).

The direction of the electric field curtain force alternates at a frequency of the applied AC voltage. Then, charged toning material oscillates so that a head is hard to be blocked. The ejection pressure can be controlled because the ejection force is proportional to the applied voltage.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. A printer for ejecting toning material selectively toward a recording member, comprising:
a nozzle means which is insulated electrically and has an aperture of narrow size;
a means for supplying toning material into the nozzle means;
a means for applying the electric field curtain force on toning material near the aperture of the nozzle means which includes at least one pair of electrodes for generating the electric field curtain force, said electrodes being arranged near the aperture so as to oppose to each other with respect to the direction of ejection of the toning material;
an electric power source which applies alternating voltage to the electrodes; and
a control means for controlling the application of the alternating voltage by the electric power source selectively according to image signal.

2. A printer according to claim 1, further comprising means for moving the nozzle means relative to the recording medium.

3. A printer according to claim 1, wherein said nozzle means comprises a plurality of nozzles arranged in parallel along a line.

4. A printer according to claim 1, wherein one electrode of said pair of electrodes is connected to said electric power source and the other electrode is grounded via a switch means which is controlled by said control means.

5. A printer according to claim 1, wherein two pairs of said electrodes are arranged near to each other.

6. A printer according to claim 5, wherein one electrode of each pair of electrodes is connected to said electric power source and the other electrode of each of electrodes are grounded via a switch means which is controlled by said control means.

7. A printer according to claim 1, wherein said toning material is ink.

8. A printer according to claim 7, wherein said ink includes solvent and dye dissolved in the solvent.

9. A printer according to claim 7, wherein said ink includes solvent and pigment particles dispersed in the solvent.

10. A printer according to claim 7, further comprising means for moving the nozzle means relative to the recording medium.

11. A printer according to claim 7, wherein said nozzle means comprises a plurality of nozzle arranged in parallel along a line.

12. A printer according to claim 7, wherein one electrode of said pair of electrodes is connected to said electric power source and the other electrode is grounded via a switch means which is controlled by said control means.

13. A printer according to claim 7, wherein two pairs of said electrodes are arranged near to each other.

14. A printer according to claim 13, wherein one electrode of each pair of electrodes is connected to said electric power source and the other electrode of each pair of electrodes is grounded via a switch means which is controlled by said control means.

15. A printer according to claim 7, wherein said electrodes are arranged on the outer face of the nozzle means so as not to contact with the toning material and said toning material is charged before the toning material is provided in the nozzle means.

16. A printer according to claim 7, wherein said electrodes are arranged on the inner face of said nozzle means so as to contact with said toning material and the toning material is charged on the application of alternating electric voltage by said control means.

17. A printer according to claim 1, wherein said toning material is fine toner particles.

18. A printer according to claim 17, further comprising means for moving the nozzle means relative to the recording medium.

19. A printer according to claim 17, wherein said nozzle means comprises a plurality of nozzle arranged in parallel in a line.

20. A printer according to claim 17, wherein one electrode of said pair of electrodes is connected to said electric power source and the other electrode is grounded via a switch means which is controlled by said control means.

21. A printer according to claim 17, wherein two pairs of said electrodes are arranged near each other.

22. A printer according to claim 21, wherein one electrode of each pair of electrodes is connected to said electric power source and the other electrode is grounded via a switch means which is controlled by said control means.

23. A printer according to claim 17, wherein said electrodes are arranged on the outer face of the nozzle means so as not to contact with the toning material and a said toning material is charged before provided in the nozzle means.

24. A printer according to claim 17, wherein said electrodes are arranged on the inner face of said nozzle means so as to contact with said toning material and the toning material is charged on the application of alternating electric voltage by said control means.

25. A printer according to claim 17, further comprising a second electrode members arranged opposed to said nozzle means behind a recording medium.

26. A printer according to claim 25, wherein said second electrode means has a plurality of needle electrodes.

27. A printer according to claim 26, wherein said needle electrodes are arranged linearly.

28. A printer according to claim 26, further comprising a third electrode member set under a space between said nozzle means and a recording medium.

29. A printer according to claim 1, wherein said electrodes are arranged on the outer face of the nozzle means so as not to contact with said toning material and the toning material is charged before the toning material is provided in the nozzle means.

30. A printer according to claim 1, wherein said electrodes are arranged on the inner face of said nozzle means so as to contact with said toning material and the toning material is charged on the application of alternating electric voltage by said control means.

* * * * *